US010771837B2

(12) United States Patent
Thun et al.

(10) Patent No.: US 10,771,837 B2
(45) Date of Patent: Sep. 8, 2020

(54) SYSTEMS AND METHODS FOR PRESENTING BACKGROUND GRAPHICS FOR MEDIA ASSET IDENTIFIERS IDENTIFIED IN A USER DEFINED DATA STRUCTURE

(71) Applicant: Rovi Guides, Inc., San Carlos, CA (US)

(72) Inventors: Christopher Thun, San Francisco, CA (US); Jordan Leonard Davis, San Jose, CA (US); Ofer Vaisler, Sunnyvale, CA (US)

(73) Assignee: Rovi Guides, Inc., San Jose, CA (US)

( * ) Notice: Subject to any disclaimer, the term of this patent is extended or adjusted under 35 U.S.C. 154(b) by 173 days.

(21) Appl. No.: 15/410,321

(22) Filed: Jan. 19, 2017

(65) Prior Publication Data

US 2018/0070128 A1    Mar. 8, 2018

Related U.S. Application Data

(60) Provisional application No. 62/384,608, filed on Sep. 7, 2016.

(51) Int. Cl.
*H04N 21/431* (2011.01)
*G06F 16/50* (2019.01)
(Continued)

(52) U.S. Cl.
CPC ....... *H04N 21/4312* (2013.01); *G06F 16/438* (2019.01); *G06F 16/50* (2019.01); *H04N 21/26283* (2013.01); *H04N 21/278* (2013.01); *H04N 21/4532* (2013.01); *H04N 21/4821* (2013.01); *H04N 21/84* (2013.01)

(58) Field of Classification Search
CPC ........... H04N 21/4312; H04N 21/4821; H04N 21/4532; H04N 21/84; H04N 21/278; H04N 21/26283; H04N 21/42216; H04N 21/42209; H04N 60/72; H04N 21/23109;
(Continued)

(56) References Cited

U.S. PATENT DOCUMENTS 6,938,208 B2     8/2005  Reichardt
10,140,314 B2 * 11/2018  Sirven ................. G06F 3/04845
(Continued)

FOREIGN PATENT DOCUMENTS

EP         2656176        6/2012

*Primary Examiner* — Benjamin R Bruckart
*Assistant Examiner* — Tien M Nguyen
(74) *Attorney, Agent, or Firm* — Haley Guilliano LLP

(57) ABSTRACT

Systems and methods are provided herein for selecting graphics to use as backgrounds of media asset identifiers. To this end, a media guidance application may determine that a media asset identifier is to be generated for display, and may determine whether the user input an explicit preference for a media asset corresponding to the media asset identifier (e.g., the user added the media asset to his watch list). In response to determining that the user input the explicit preference for the media asset corresponding to the media asset identifier, the media guidance application may determine display dimensions of the second media asset identifier, select a graphic that corresponds to the display dimensions, and generate for display the selected graphic as a background graphic of the media asset identifier.

20 Claims, 7 Drawing Sheets

(51) Int. Cl.
*H04N 21/262* (2011.01)
*H04N 21/482* (2011.01)
*H04N 21/84* (2011.01)
*G06F 16/438* (2019.01)
*H04N 21/278* (2011.01)
*H04N 21/45* (2011.01)

(58) Field of Classification Search
CPC ............ H04N 21/4332; H04N 21/4314; G06F 17/3005; G06F 16/50; G06F 16/438
See application file for complete search history.

(56) References Cited

U.S. PATENT DOCUMENTS

| | | | |
|---|---|---|---|
| 2006/0127041 A1* | 6/2006 | Shimizu | G11B 27/3081 386/244 |
| 2008/0196076 A1* | 8/2008 | Shatz | H04N 1/00127 725/116 |
| 2010/0153997 A1 | 6/2010 | Baumgartner | |
| 2015/0382052 A1* | 12/2015 | Pearlman | H04N 21/4312 725/46 |
| 2015/0382068 A1* | 12/2015 | Shimy | H04N 21/482 725/40 |

\* cited by examiner

SYSTEMS AND METHODS FOR PRESENTING BACKGROUND GRAPHICS FOR MEDIA ASSET IDENTIFIERS IDENTIFIED IN A USER DEFINED DATA STRUCTURE

CROSS-REFERENCE TO RELATED APPLICATIONS

This patent application claims the benefit of U.S. Provisional Patent Application No. 62/384,608, filed Sep. 7, 2016, currently pending, the disclosure of which is hereby incorporated by reference herein in its entirety.

BACKGROUND

Given the plethora of media assets available to consumers, it is often difficult for users to quickly determine media assets they are interested in accessing. In order to aid users, many media asset providers provide media guidance applications that visually present media asset identifiers, which contain information relating to media assets. One particularly common presentation method is a "grid-guide" with rows corresponding to, e.g., channels and columns corresponding to, e.g., times, where each row-column combination contains a media asset identifier.

To help users remember media assets they are interested in, media guidance applications may allow users to create customized lists, such as for favorite channels, or watch lists for particular media assets or series of media assets they would like to access. However, unless a user commonly checked his or her watch list, the user may not remember media assets saved on it while navigating listings in a grid-guide.

SUMMARY

Systems and methods are provided herein for selecting graphics to display as backgrounds of media asset identifiers (e.g., to remind a user that the media asset corresponding to a given media asset identifier forms part of a custom list). To this end, a media guidance application (e.g., executed by control circuitry of a user equipment or remote server) may determine that a media asset identifier is to be generated for display. For example, when the user presses the "guide" button on his or her remote controller, or on a mobile device application, a guide including many media asset identifiers may be generated for display. Thus, the media guidance application may determine that a media asset identifier is to be generated for display when the "guide" button is selected.

In some embodiments, the media guidance application may determine whether the user has input an explicit preference for a media asset corresponding to the media asset identifier. For example, the media guidance application may determine whether a media asset identifier (e.g., program listing) to be displayed in a guide corresponds to a media asset of a watch list.

In response to determining that the user input the explicit preference for the media asset corresponding to the media asset identifier, the media guidance application may determine display dimensions of the second media asset identifier (e.g., a size of a cell of a program listing in a guide), and may select a graphic that corresponds to the display dimensions (e.g., a background image that will fit in the cell). The media guidance application may then generate for display the selected graphic as a background graphic of the media asset identifier.

In some embodiments, the media guidance application may receive a plurality of media asset identifiers (e.g., media asset identifiers corresponding to an electronic program guide). The media guidance application may compare metadata of each of the plurality of received media asset identifiers with metadata of a first media asset identifier stored in a data structure defined by the user. For example, the media guidance application may determine whether a title of a media asset identifier as reflected in the metadata corresponds to a title of a media asset on a watch list of the user.

In some embodiments, the media guidance application may determine, based on the comparison, that a second media asset identifier of the plurality of received media asset identifiers corresponds to the first media asset identifier in the data structure defined by the user (e.g., that a media asset identifier to be displayed (e.g., in a guide) is also in the user's watch list. The media guidance application, in response to determining, based on the comparison, that the second media asset identifier of the plurality of received media asset identifiers corresponds to the first media asset identifier in the data structure defined by the user, may determine display dimensions of the second media asset identifier (e.g., the size of a cell of a media asset identifier corresponding to the media asset).

In some embodiments, the media guidance application may access a database storing a plurality of graphics associated with the second media asset identifier, may retrieve, from a field in the database corresponding to a respective graphic of the plurality of graphics associated with the second media asset identifier, the dimensions of the respective graphic, may compare the dimensions of the respective graphic to the display dimensions of the second media asset identifier, and may determine whether the dimensions of the respective graphic match the display dimensions of the second media asset identifier. For example, after determining the size of a cell corresponding to a program listing that is to be displayed that is also on the user's watch list, the media guidance application may seek a graphic to use in the background of the cell that has the same dimensions as the cell.

In response to determining that the dimensions of the graphic match the display dimensions of the second media asset identifier, the media guidance application may retrieve, from the database containing the plurality of graphics associated with the second media asset identifier, the graphic corresponding to the second media asset identifier, and may generate for display the retrieved graphic as a background graphic of the second media asset identifier.

In some embodiments, the media guidance application, when determining whether the dimensions of the respective graphic match the display dimensions of the second media asset identifier, may retrieve a first value for the display dimensions of the second media asset identifier (e.g., the dimensions of a program listing cell), and may retrieve a second value for the dimensions of the respective graphic (e.g., a candidate graphic for use in the background of the program listing cell). The media guidance application may calculate a difference between the first value and the second value, and may determine whether the dimensions of the graphic match the display dimensions of the second media asset identifier based on the calculated difference being within a threshold difference. For example, if a candidate background graphic is substantially the same size as a program listing cell for a program that is on the user's watch list, the media guidance application may conclude that the candidate background graphic is suitable to use as a background graphic of the cell.

In some embodiments, the second value is greater than the first value and the calculated difference exceeds the threshold difference (e.g., the candidate background graphic is too large to be used as a background graphic for the program listing cell). In this case, the media guidance application may open a file containing data for the retrieved graphic, and may determine a portion of the data to remove, that, if removed, would cause the difference to be within the threshold difference.

In some embodiments, the data is a pixel map containing pixel coordinates with associated properties for each pixel. The media guidance application may, in this scenario, determine the portion of the data to remove, that, if removed, would cause the difference to be within the threshold difference, by retrieving color information for a first pixel from the pixel map, determining that a subset of pixels of the pixel map with pixel coordinates near the first pixel have the same color information, and marking the subset of pixels as the portion to not be generated for display when generating for display the background graphic. For example, a region of pixels that are a solid black may be eliminated from the candidate background image to cause the candidate background image to fit into the cell of the program listing.

In some embodiments, the media guidance application may determine the portion of the data to remove, that, if removed, would cause the difference to be within the threshold difference, by retrieving, from a user profile corresponding to the user, an indication that the user prefers a first type of image. For example, the media guidance application may prefer images with certain actors whom are in those images. The media guidance application may then determine whether a plurality of types of images are contained in the file including the first type of image (e.g., multiple actors, some of the preferred type, and some of a non-preferred type). In response to determining that the plurality of types of images are contained in the file including the first type of image, the media guidance application may mark a subset of the data defining each of the plurality of types that are not the first type of image as the portion to not be generated for display when generating for display the background graphic. For example, an image of one actor may be deleted from the candidate background graphic in favor of an image of another actor that the user prefers in order to fit the candidate background image into the cell.

In any case, the media guidance application may generate for display the retrieved graphic as the background graphic without the determined portion of the data from the file. Thus, the media guidance application may delete an unwanted, low-importance, and/or monotone region of a background image in order to cause the image to fit into a media asset identifier, such as a cell corresponding to a program listing.

In some embodiments, the first value is greater than the second value and the calculated difference exceeds the threshold difference (e.g., the candidate background image is substantially smaller than the cell for which it is to be used). In this case, the media guidance application may determine whether an additional graphic with dimensions smaller than the second media asset identifier is contained in the database. In response to determining that the additional graphic with display dimensions smaller than the second media asset identifier is contained in the database, the media guidance application may retrieve the additional graphic, and may generate for display a composite graphic with the retrieved graphic and the additional graphic, wherein the composite graphic matches the display dimensions of the second media asset identifier. For example, the media guidance application may merge two smaller graphics to form a graphic of a suitable size to fit as a background of a cell of a program listing.

In some embodiments, the media guidance application may determine that each respective graphic of the plurality of graphics associated with the second media asset identifier stored in the database do not match the display dimensions. For example, the media guidance application may determine that a library of candidate background graphics does not have a candidate that fits in a cell corresponding to the program listing for a program that is in the user's watch list. In response to determining dimensions of each respective graphic of the plurality of graphics associated with the second media asset identifier stored in the database do not match the display dimensions of the second media asset identifier, the media guidance application may access a webpage, and may retrieve, from the source code for the webpage, metadata associated with a webpage graphic. For example, if the media asset identifier corresponds to the program series "Family Guy," and there is no suitable background for a cell for "Family Guy" because the candidate background images are suitable for a thirty minute episode, but a special sixty minute episode is represented in the guide, the media guidance application may seek to use a different image from a web page that references the program series "Family Guy."

In some embodiments, the media guidance application may compare the metadata associated with the webpage graphic with the metadata of the second media asset identifier, and, in response to determining the metadata associated with the graphic matches the metadata of the second media asset identifier, the media guidance application may retrieve the webpage graphic, and may generate for display the retrieved webpage graphic as the background graphic.

In some embodiments, the media guidance application, when determining the display dimensions of the second media asset identifier, may access a display template containing display dimensions for a plurality of template media asset identifiers. For example, the template may reflect a size of a program listing cell based on how long the program will air. The media guidance application may compare the metadata associated with the second media asset identifier with metadata associated with each of the plurality of template media asset identifiers, and may determine that the second media asset identifier corresponds to a template media asset identifier of the plurality of template media asset identifiers. The media guidance application may thus determine the display dimensions for the template media asset identifier to be the display dimensions for the second media asset identifier.

In some embodiments, the retrieved graphic is a first graphic. The media guidance application may retrieve a second graphic from the database with dimensions that match the display dimensions of the second media asset identifier, and may determine that the user has navigated to the second media asset identifier. In response to determining that the user has navigated to the second media asset identifier, the media guidance application may generate for display the second graphic as the background graphic of the second media asset identifier instead of the first graphic. For example, a more vivid version of the background graphic may replace the background graphic if the user highlights a program listing cell corresponding to the second media asset identifier.

In some embodiments, the media guidance application, when generating for display the retrieved graphic as the background graphic of the second media asset identifier, may determine a section of the graphic that text relating to the second media asset identifier will be displayed over. The media guidance application may determine an average color of the section of the graphic, and may access a complementary colors database and retrieve from the complementary colors database, a complementary color to the average color. For example, if the average color of the background graphic is black, black text will be unreadable on top of the background graphic; thus, white may be used, which will be very readable on top of a black graphic. The media guidance application may generate for display the text relating to the second media asset identifier in the complementary color.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are disclosed herein for displaying graphics as backgrounds of media asset identifiers. For example, a media guidance application (e.g., executed by control circuitry of user equipment, such as a set-top box) determines that a media asset referenced in a user-defined data structure, such as a watch list, corresponds to a media asset identifier (e.g., a listing in a grid-guide). The media guidance application may then retrieve a graphic relating to the media asset identifier and display it as a background behind the media asset identifier. In this way, these systems and methods customize individual media asset identifiers with background graphics related to the media assets to allow a user to remember a) that they are interested in the media asset associated with the media asset identifier and b) view visual content that may help remind the user why they were interested in the media asset.

Figure 1:
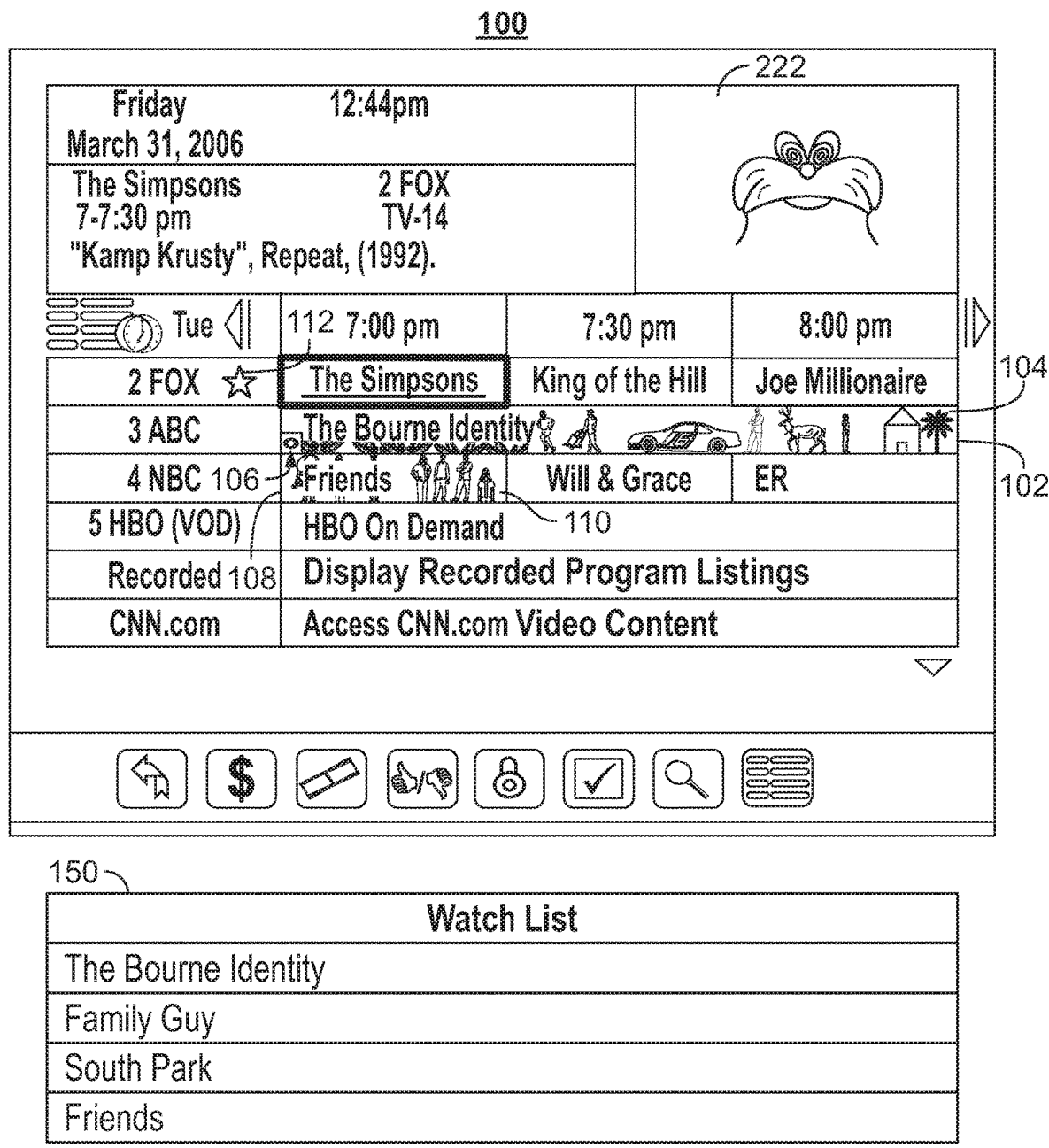
FIG. 1 shows an illustrative example of a display including a graphic as a background of a media asset identifier, as well as a user-defined data structure, in accordance with some embodiments of the disclosure.

FIG. 1 shows an illustrative example of a display including a graphic as a background of a media asset identifier, as well as a user-defined data structure, in accordance with some embodiments of the disclosure. For example, display 100 may be presenting a media guidance application used by a user to navigate media asset identifiers (e.g., listings) in a grid-guide format, as described further below with respect to FIGS. 2-3. Display 100 may appear on one or more user devices (e.g., any of the devices listed in FIGS. 4-5 below). Moreover, the media guidance application may use the process described in FIGS. 6-8 below to generate display 100 or any of the features described therein.

FIG. 1 includes media asset identifier 102, which, as illustrated, is a program listing for a particular media asset ("The Bourne Identity") that is scheduled to start at 7 pm on channel 3. Media asset identifier 102, however, may be any media asset identifier defined below with respect to FIGS. 2-5, and is not limited to a program listing. Media asset identifier 102 has background graphic 104, which is related to the media asset "The Bourne Identity." Background graphic 104 may be a frame from a scene of the media asset, cover art from a poster relating to the media asset, box art, an image of actors, actresses, or other personnel associated with the media asset, and/or any other image relating to media asset identifier 102.

Media asset identifier 102 optionally may contain an additional standardized indicator for why the background graphic was displayed with media asset identifier 102. For example, background graphic 104 may be displayed with media asset identifier 102 because media asset identifier 102 was determined to be part of a watch list for a user. In such a scenario, the media guidance application may generate for display indicator 106 with an indication that the media asset is on a user's watch list.

As used herein, the term "watch list" is defined to mean a data structure containing references to media assets that a user has added to the data structure. For example, if a user wishes to view a media asset later, the user may select an option to add the media asset to his watch list. If the media guidance application receives a selection of this option, the media guidance application may add the media asset to the data structure. The media guidance application may generate for display a list of all references in the data structure (e.g., in response to a user request to view such a list). Indicator 106 is not limited to referring to a watch list—indicator 106 may also identify any other information relating to a data structure defined by the user. For example, the media guidance application may determine that a media asset on display 100 is in a user's favorites list, has been viewed before by the user, is in the same series as another program preferred by a user, and/or any other information indicated in a profile of the user. The media guidance application may generate for display indicator 106 in any manner that explains why media asset identifier 102 is being generated for display with background 104. When the term "watch list" is used in this disclosure, this term is used merely for convenience, and may be substituted for any other user-defined data structure.

Display 100 also includes media asset identifier 108 which is, e.g., a listing for a particular media asset (an episode of the series "Friends") that is scheduled to start at 7 pm on channel 4. Media asset identifier 108 has background graphic 110, which is related to the media asset "Friends." Media asset identifier 108 has the same qualities as media asset identifier 102. Background graphic 110 has the same qualities as background graphic 104. Background graphic 110 may be a frame from a scene of a media asset corresponding to media asset identifier 108, cover art from a poster relating to the media asset, or an image of actors, actresses, or other personnel associated with the media asset.

Display 100 optionally may include indications of favorite media sources of the user based on a favorite media source list of the user. For example, display 100 may optionally include favorite channel indicator 112, which signifies that a channel (e.g., channel 2) is a favorite channel. Similar to the user-defined data structure relating to media assets described above, the media guidance application may retrieve information for a user-defined data structure relating to media sources. Media sources may be distinguished in the same manner that a media asset is distinguished if a media source matches an entry of such a data structure.

The media guidance application may determine to display to a user a media asset identifier with a background graphic that fits display dimensions of the media asset identifier. For example, the media guidance application may determine to display a background graphic (e.g., background graphic 104 or background graphic 110) for a media asset identifier (e.g., media asset identifier 102 or media asset identifier 108) based on whether that media asset identifier is on a data structure defined by a user, such as watch list 150.

As referred to herein, a "graphic" should be understood to mean any combination of image(s) and/or text that relates to the media asset identifier or to a media asset that corresponds thereto. In some embodiments, the graphic may be box art (e.g., a movie poster) related to the media asset identifier. In other embodiments, the graphic may be a quotation from the media asset associated with the media asset identifier (e.g., "Show me the money!"). In yet another embodiment, the graphic may be a screenshot or frame of a particular scene in the media asset. In still another embodiment, the graphic may include images of an actor, actress, director, or other person associated with the media asset corresponding to the media asset identifier. In another embodiment, the graphic may be any visual presentation related to a media asset identifier or a media asset that corresponds thereto.

In some embodiments, the media guidance application receives a plurality of media asset identifiers. For example, the media guidance application may receive the media asset identifiers (e.g., media asset identifiers 102 and 110) from a remote server via a communication pathway (e.g., over a broadband network). The media asset identifiers may be received via a request from the media guidance application or as periodic automatic updates (e.g., the media guidance application receives media asset identifiers for media assets starting between 4-6 pm at 3:30 pm and media asset identifiers for media assets starting between 6-8 pm at 5:30 and so on). The media guidance application may receive the media asset identifiers in response to any request, such as a request to access a web page, an applet or application (e.g., an application on a smartphone or tablet device), a press of a "guide" button on a remote controller, or any other manner of generating a request.

The media guidance application may then compare metadata of each of the plurality of media asset identifiers with metadata of a media asset identifier stored in a data structure defined by a user. As described above, the data structure defined by the user may be, e.g., a watch list, such as watch list 150. While watch list 150 is illustrated as a watch list, any other data structure defined by the user that relates to media assets (as defined in the foregoing) may be substituted for watch list 150. Watch list 150 may be stored local to user equipment or remote to user equipment (e.g., at a remote server). Storage locations and manners of accessing storage are described in further detail below with respect to FIGS. 2-5.

The media guidance application may retrieve, or otherwise access, from watch list 150, metadata for a particular media asset identifier on the watch list. The metadata may be any string of alphanumeric characters, such as the title of the media asset (e.g., "The Bourne Identity"). The media guidance application may then compare the retrieved metadata for the media asset identifier on the watch list with metadata associated with the media asset identifier (e.g., media asset identifier 102). The media guidance application may perform the comparison by comparing each successive character in a string of characters and determining whether there are any differences. The media guidance application then determines, based on the comparison, that the media asset identifier to be displayed on guide 100 corresponds to a media asset identifier on the watch list 150 (e.g., "The Bourne Identity" or "Friends"). For example, in response to determining that each character of the retrieved metadata from the media asset identifier on the list matches corresponding characters of metadata from the media asset identifier (e.g., media asset identifier 102), the media guidance application may determine that the two correspond. The media guidance application may determine a correspondence with less than a complete match as well using fuzzy logic.

In some embodiments, the media guidance application may retrieve a graphic (e.g., background graphic 104) corresponding to a media asset identifier that is to be generated for display on display 100 and matches a media asset of watch list 150 (e.g., a media asset corresponding to media asset identifier 102). For example, the media guidance application may access a database containing a plurality of graphics each associated with a media asset identifier (e.g., media asset identifier 102 or media asset identifier 110) stored either locally in storage or remotely at a media guidance data source accessible via a communications pathway. The database may be organized as a table where each row corresponds to a specific graphic (e.g., background graphic 104 or background graphic 110) and columns contain metadata identifying media asset identifiers (e.g., media asset identifier 102 or 108) that relate to the particular graphic. One column of the table may contain a pointer to a location in memory storing a data file for the graphic (e.g., background graphic 104 or 110) that can be retrieved by the media guidance application. The database may be organized in any fashion that enables the media guidance application to retrieve graphics relating to a given media asset.

In some embodiments, the media guidance application determines, based on the comparison, the display dimensions of the media asset identifier. For example, the media guidance application may determine from metadata associated with the media asset identifier values for height and width for the media asset identifier when it is displayed (e.g., in a grid-guide). As a specific example, media asset identifier 102 spans multiple half hour time slots (e.g., 7-8:30 pm), so a longer background graphic would be needed to fill the background of media asset identifier 102 than media asset identifier 108, which only spans a half hour time slot (e.g., the aspect ratio of media asset identifier 102 may be 4:1 and the aspect ratio of media asset identifier 108 may be 2:1).

The media guidance application may then access a database storing a plurality of graphics associated with the media asset identifier, and may retrieve a graphic that has dimensions that match the display dimensions. For example, the media guidance application may retrieve a value for the height and width of a graphic (e.g., background graphic 104 or background graphic 110) determined to correspond to the media asset identifier, as described above. The height and width of the graphic (e.g., background graphic 104 or 110) may be stored in column(s) of the table, or may be determined from the data file of the graphic (e.g., either in a header of the file or by examining the pixel coordinates of a bitmap file). Based on comparing the dimensions of the graphic (e.g., background graphic 104 or 110) to the dimensions of the media asset identifier (e.g., media asset identifier 102 or 108), the media guidance application may determine whether the dimensions match and, if the dimensions are determined to match, the media guidance application may retrieve the graphic (e.g., background graphic 104 or background graphic 110).

As another example, the media guidance application may retrieve a single value for the aspect ratio of the cell the media asset identifier (e.g., media asset identifier 102 or 108) will be displayed in (e.g., 2:1 width to height for a 30 minute program and 4:1 for an hour long program) when generated for display as part of a grid-guide. The media guidance application may then scale a graphic (e.g., background graphic 104 or 110) with the same aspect ratio to fit the media asset identifier displayed in a cell of a grid-guide different size display screens.

The media guidance application then may select the graphic from a plurality of graphics associated with the media asset identifier based on the graphic matching the display dimensions. For example, the media guidance application may access a database containing a plurality of graphics (e.g., background graphic 104 or 110) associated with the media asset identifier (e.g., media asset identifier 102 or media asset identifier 108). The media guidance application then may retrieve the dimensions of each graphic (e.g., background graphic 104 or background graphic 110) stored at the database associated with the media asset identifier. Based on comparing the dimensions of the graphic (e.g., background graphic 104 or background graphic 110) to the dimensions of the media asset identifier, the media guidance application may determine whether the dimensions match and retrieve the graphic (e.g., background graphic 104 or background graphic 110). In some embodiments, if the dimensions match within a tolerance factor (e.g., an aspect ratio of 1.9:1 is within a tolerance factor of 2:1 if the factor is +/−20%), then the media guidance application retrieves the graphic (e.g., background graphic 104 or 110).

The tolerance factor may be a threshold set by an editor of the media guidance application, and may be static or may vary according to a predefined function. For example, the media guidance application may determine whether, for a large graphic (e.g, a graphic for a large cell, such as the cell holding media asset identifier 102), whether a graphic is within a large threshold (e.g., within the 20% tolerance factor described above), and if the graphic is 19% different from the dimensions of the cell for media asset identifier 102, the media guidance application may expand or shrink the graphic to become background graphic 104 (e.g., because a large graphic is unlikely to be significantly distorted by a large-scale shrinking or expansion). However, for a small cell (e.g., the cell for media asset identifier 108), such a large threshold may cause huge distortion, and thus the media guidance application may be programmed to set a lower threshold for smaller cells (e.g., a 5% or 10% tolerance factor). The media guidance application may have a preprogrammed function that sets tolerance factors or other thresholds based on a cell size for a given media asset identifier.

In some embodiments, the media guidance application determines that dimensions of the graphic do not match the display dimensions of the media asset identifier. For example, the media guidance application may be unable to retrieve a graphic that has the same dimensions as the media asset identifier when displayed as a cell in a grid-guide due to a limited number of graphics available to be retrieved. As described above, the media guidance application may determine values for height and width for the media asset identifier (e.g., media asset identifier 102 or 108) when it is displayed (e.g., on display 100). The media guidance application may also determine values for the height and width of the retrieved graphic (e.g., background graphic 104 or 110), as described above. Based on comparing the values of the respective pixel heights and widths of the media asset identifier (e.g., media asset identifier 102 or 108) and the graphic (e.g., background graphic 104 or 110), the media guidance application may determine they do not match.

Alternatively, the media guidance application may compare the aspect ratios (e.g., width to height ratios) of the graphic and the displayed media asset identifier. For example, if the graphic has an aspect ratio of 2:1.5 and the media asset identifier when generated for display as a cell in a grid-guide has an aspect ratio of 4:1, the media guidance application may determine that since the heights do not match the display dimensions do not match. In some embodiments, the media guidance application may determine the dimensions do not match if all dimensions do not match. In other embodiments, the media guidance application may determine the dimensions to not match if only a single dimension does not match. Matching, as used herein, need not refer to an exact match. Rather, matching may refer to whether the dimensions, aspect ratio, or any other attribute relating to size of a graphic is within a threshold difference with respect to the same attribute of media asset 104.

In some embodiments, a candidate background graphic for a media asset identifier may be too large to be used as a background graphic for a given media asset identifier. The media guidance application may determine that this is the case when the graphic's dimensions are determined to be over the threshold difference from the size of the media asset identifier. When the candidate background graphic is too large to be used, the media guidance application may seek to alter the candidate graphic in a manner that causes the dimensions of the candidate graphic to match the dimensions of the media asset identifier. To this end, the media guidance application may open a file containing data for the retrieved graphic, and may determine a portion of the data to remove, that, if removed, would cause the difference to be within the threshold difference.

In some embodiments, the data is a pixel map containing pixel coordinates with associated properties for each pixel. The media guidance application may, in this scenario, determine the portion of the data to remove, that, if removed, would cause the difference to be within the threshold difference, by retrieving color information for a first pixel from the pixel map, determining that a subset of pixels of the pixel map with pixel coordinates near the first pixel have the same color information. The media guidance application may determine an amount of pixels of this subset that would need to be removed in order to cause the difference to be within the threshold difference. The media guidance application may then mark the subset of pixels (or less than the entire subset, depending on the determined amount) as the portion to not be generated for display when generating for display the background graphic. For example, a region of pixels that are a solid black may be eliminated from the candidate background image to cause the candidate background image to fit into the cell of the program listing.

In some embodiments, the media guidance application may determine the portion of the data to remove, that, if removed, would cause the difference to be within the threshold difference, by retrieving, from a user profile corresponding to the user, an indication that the user prefers a first type of image. For example, the media guidance application may determine that the user prefers images with certain actors whom are in those images. The media guidance application may determine the preferences of the user by querying a profile associated with the user. A user profile is described below with respect to FIGS. 2-5.

The media guidance application may then determine whether a plurality of types of images are contained in the file including the first type of image (e.g., multiple actors, some of the preferred type, and some of a non-preferred type). In response to determining that the plurality of types of images are contained in the file including the first type of image, the media guidance application may mark a subset of the data defining each of the plurality of types that are not the first type of image as the portion to not be generated for display when generating for display the background graphic. The media guidance application, when generating for display the graphic as a background graphic (e.g., background graphic 104), may omit the marked subset from the display. For example, an image of one actor may be deleted from the candidate background graphic in favor of an image of another actor that the user prefers in order to fit the candidate background image into the cell. Manners of determining which portions of an image to display based on user preferences are described in further detail in U.S. patent application Ser. No. 14/752,031, filed Jun. 26, 2015, currently pending, the contents of which are hereby incorporated by reference herein in their entirety.

In any case, the media guidance application may generate for display the retrieved graphic as the background graphic without the determined portion of the data from the file. Thus, the media guidance application may delete an unwanted, low-importance, and/or monotone region of a background image in order to cause the image to fit into a media asset identifier, such as a cell corresponding to a program listing.

Going back to the determination of whether dimensions of the second image (e.g., the candidate background image) is within a threshold of the dimensions of the first image (e.g., the media asset identifier), in some embodiments, the media guidance application may determine that the first value is greater than the second value and the calculated difference exceeds the threshold difference (e.g., the candidate background image is substantially smaller than the cell for which it is to be used). In this case, the media guidance application may determine whether an additional graphic with dimensions smaller than the second media asset identifier is contained in the database. The media guidance application may, in determining whether the additional graphic is in the database, determine how large the additional graphic would ideally be in order to create a composite graphic of the additional graphic and the candidate graphic that is within the threshold difference of dimensions of the media asset identifier. The media guidance application may also consider dimensions of candidate additional graphics and may determine whether the dimensions of the candidate additional graphics allow for an expansion or reduction of the candidate additional graphic's size without significant distortion in order to create the requisite composite graphic.

In response to determining that the additional graphic with display dimensions smaller than the second media asset identifier is contained in the database, the media guidance application may retrieve the additional graphic, and may generate for display a composite graphic with the retrieved graphic and the additional graphic, wherein the composite graphic matches the display dimensions of the second media asset identifier. For example, the media guidance application may merge two smaller graphics to form a graphic of a suitable size to fit as a background of a cell of a program listing. In some embodiments, the media guidance application may seek and merge more than two graphics to form the graphic of the suitable size.

In order to merge the two (or more) graphics, the media guidance application may determine an optimal manner of stitching the two graphics together. For example, the media guidance application may determine that the color of the left side of the candidate graphic complements, or is the same color, and the color of the right side of the candidate additional graphic. Thus, the additional candidate graphic may be merged on the left side of the candidate graphic. The media guidance application may additionally or alternatively use any image processing technique (e.g., smoothing, filtering, grayscale, or any other image manipulation) to create a single seamless graphic using each of the two graphics.

In some embodiments, the media guidance application may determine that each respective graphic of the plurality of graphics associated with the second media asset identifier stored in the database do not match the display dimensions. For example, the media guidance application may determine that a library of candidate background graphics does not have a candidate that fits in a cell corresponding to the program listing for a program that is in the user's watch list.

In response to determining dimensions of each respective graphic of the plurality of graphics associated with the second media asset identifier stored in the database do not match the display dimensions of the second media asset identifier, the media guidance application may access a webpage, and may retrieve, from the source code for the webpage, metadata associated with a webpage graphic. For example, if the media asset identifier corresponds to the program series "Friends," (e.g., media asset identifier 108) and there is no suitable background for a cell for "Friends" because the candidate background images are suitable for a thirty minute episode, but a special sixty minute episode is represented by media asset identifier 108, the media guidance application may seek to use a different image from a web page that references the program series "Friends" as background image 110.

The media guidance application may select the webpage to access based on metadata of the media asset identifier. For example, media asset identifier 108 may include metadata relating to a title of the media asset, a time at which the media asset is to be broadcast, and the like. The media guidance application may search for web pages based on any metadata, such as, e.g., the title "Friends." The media guidance application may access a top-ranked search result webpage in order to search for a webpage graphic suitable to use as background graphic 110.

In some embodiments, the media guidance application may compare the metadata associated with the webpage graphic with the metadata of the second media asset identifier (e.g., media asset identifier 108), and, in response to determining the metadata associated with the graphic matches the metadata of the second media asset identifier, the media guidance application may retrieve the webpage graphic, and may generate for display the retrieved webpage graphic as background graphic 110.

The media guidance application then may, if necessary, adjust the graphic to match the display dimensions. For example, the media guidance application may perform any combination of cropping, scaling, and/or other forms of modifying the graphic so that the dimensions match the display dimensions. As a specific example, the media guidance application may crop a graphic (e.g., background graphic 104 or 110) with dimensions 300×400 such that it can fit in a 200×300 cell of a grid-guide where a media asset identifier is displayed (e.g., media asset identifier 102 or 108) by removing regions from both the height and the width of the graphic (e.g., background graphic 104 or 110). Manners of adjusting a graphic described above are equally applicable to the webpage graphic.

In some embodiments, the regions to crop are chosen based on determining from data in the file that specific regions have very little change in color and are likely background. For example, the graphic (e.g., background graphic 104 or 110) may be stored as a bitmap file where each pixel coordinate has an associated color number (e.g., integer values for red, green, and blue that determine the hue). Based on determining that a particular region uses the same, or substantially the same, color, the media guidance application may choose that region to crop (e.g., a region that is entirely blue may be a large portion of sky which the media guidance application can crop without impacting other more important content in the graphic). In other embodiments, the media guidance application may determine the region to crop based on an indication in the user's profile that she/he likes particular actors. In this situation, the media guidance application would not crop the actor that the user likes out of the graphic (e.g., if the user likes Matt Damon, the media guidance application would not crop an image of Matt Damon out of the graphic). In yet another embodiment, the media guidance application may determine the region to crop based on the region containing text. For example, if the graphic includes the title "Friends" but the media asset identifier also includes the title "Friends," the media guidance application may choose to crop that portion of the graphic since displaying the title twice is redundant.

In some embodiments, the media guidance application may determine whether to crop or scale an image based on the aspect ratio of the dimensions of a candidate graphic and the media asset identifier. The media guidance application may make this determination based on a predetermined rule that defines when to perform cropping and scaling operations to an image. For example, the predefined rule may be to determine whether the aspect ratio of a candidate graphic is proportional to, or substantially proportional to, an aspect ratio of the media asset identifier. If the candidate graphic is (substantially) proportional to the media asset identifier, distortion is unlikely if scaling is performed, so the media guidance application may scale the candidate graphic to be background graphic 104. For example, if the graphic (e.g., background graphic 104 or background graphic 110) has dimensions 300×400 and the media asset identifier (e.g., media asset identifier 102 or media asset identifier 108) has dimensions 150×200, the media guidance application may choose to scale the graphic (e.g., since it is exactly twice as large in both dimensions) rather than crop it. If the media guidance application determines, however, that the aspect ratios are not proportional, the media guidance application may instead crop one or more portions of the candidate graphic.

In some embodiments, the media guidance application may generate for display the retrieved graphic as the background graphic of the media asset identifier (e.g., background graphic 110 of media asset identifier 108), where the graphic is selected for display because the graphic fits the display dimensions of the media asset identifier. For example, after retrieving the graphic (e.g., background graphic 104 or background graphic 110) associated with the media asset identifier (e.g., media asset identifier 102 or 108) the media guidance application generates the graphic as a background of the media asset identifier (e.g., as a background of a cell defining the media asset identifier in a grid-guide).

In some embodiments, the media guidance application, when determining the display dimensions of the second media asset identifier, may access a display template containing display dimensions for a plurality of template media asset identifiers. For example, the template may reflect a size of a program listing cell based on a run time of the program (e.g., based on how long display 100 reflects that the media asset will air if the media asset is a broadcast program). As can be seen in FIG. 1, a display template for media asset identifier 102 will be twice as wide as the media asset identifier for media asset identifier 108.

The media guidance application may compare the metadata associated with the second media asset identifier with metadata associated with each of the plurality of template media asset identifiers, and may determine whether the second media asset identifier corresponds to a template media asset identifier of the plurality of template media asset identifiers. The media guidance application may thus determine the display dimensions for the template media asset identifier to be the display dimensions for the second media asset identifier. The media guidance application may then utilize the display dimensions for the template when seeking a background graphic.

In some embodiments, after finding a background graphic (e.g., background graphic 110) for a media asset identifier (e.g., media asset identifier 108), the media guidance application may determine that the user has interacted with the media asset identifier (e.g., media asset identifier 108). The media guidance application may retrieve a second graphic from the database with dimensions that match the display dimensions of the second media asset identifier, and may, in response to determining that the user has navigated to the second media asset identifier, the media guidance application may generate for display the second graphic as the background graphic of the second media asset identifier instead of the first graphic. For example, a more vivid version of the background graphic may replace the background graphic if the user highlights a program listing cell corresponding to the second media asset identifier.

In some embodiments, the media guidance application, when generating for display the retrieved graphic as the background graphic of the second media asset identifier (e.g., background graphic 110 of media asset identifier 108), may determine a section of the graphic that text relating to the second media asset identifier will be displayed over. For example, the media guidance application may determine that the text "Friends" of media asset identifier 108 will be in the center of media asset identifier 108. The media guidance application may determine an average color of the section (e.g., the center) of the graphic (e.g., background graphic 110), and may access a complementary colors database and retrieve from the complementary colors database, a complementary color to the average color. For example, if the average color of the center of background graphic 110 is black, black text will be unreadable on top of the background graphic; thus, the media guidance application may select, based on entries of the complementary color database, that the text "Friends" should be displayed using white text, which will be very readable on top of a black graphic.

The media guidance application may generate for display the text relating to the second media asset identifier in the complementary color.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
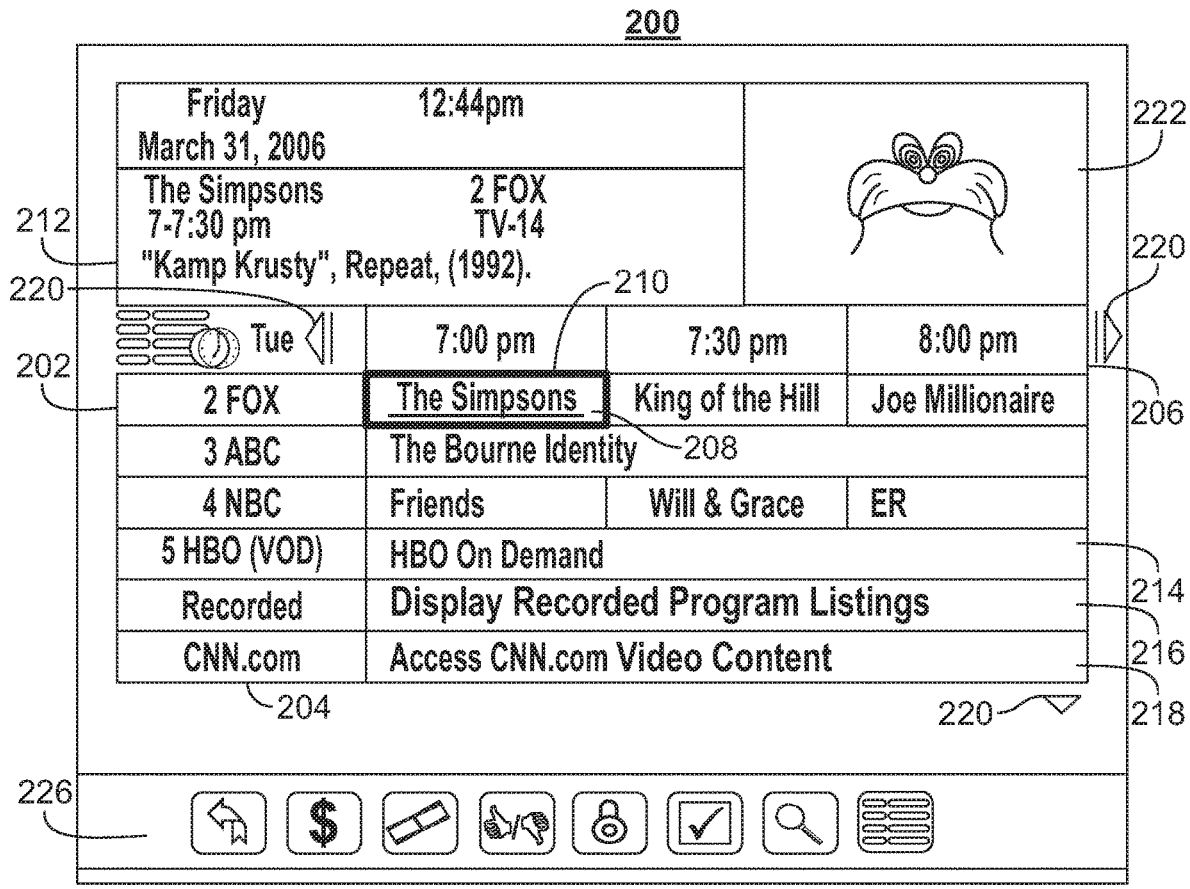
FIG. 2 shows another illustrative example of a display screen for use in accessing media content in accordance with some embodiments of the disclosure.
Figure 3:
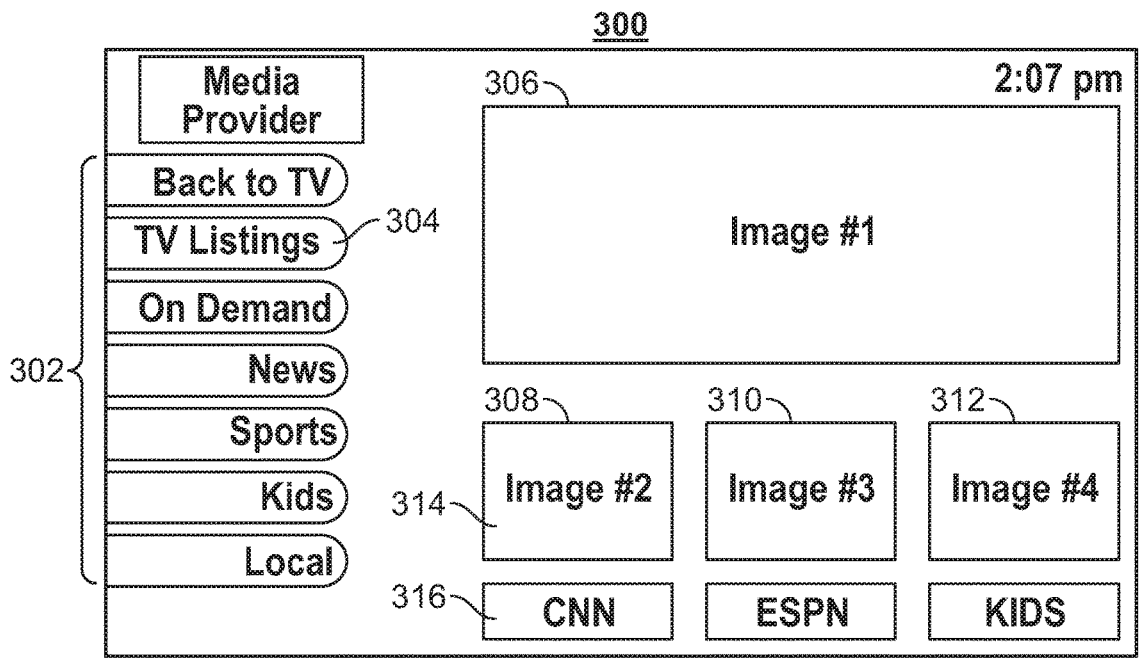
FIG. 3 shows yet another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
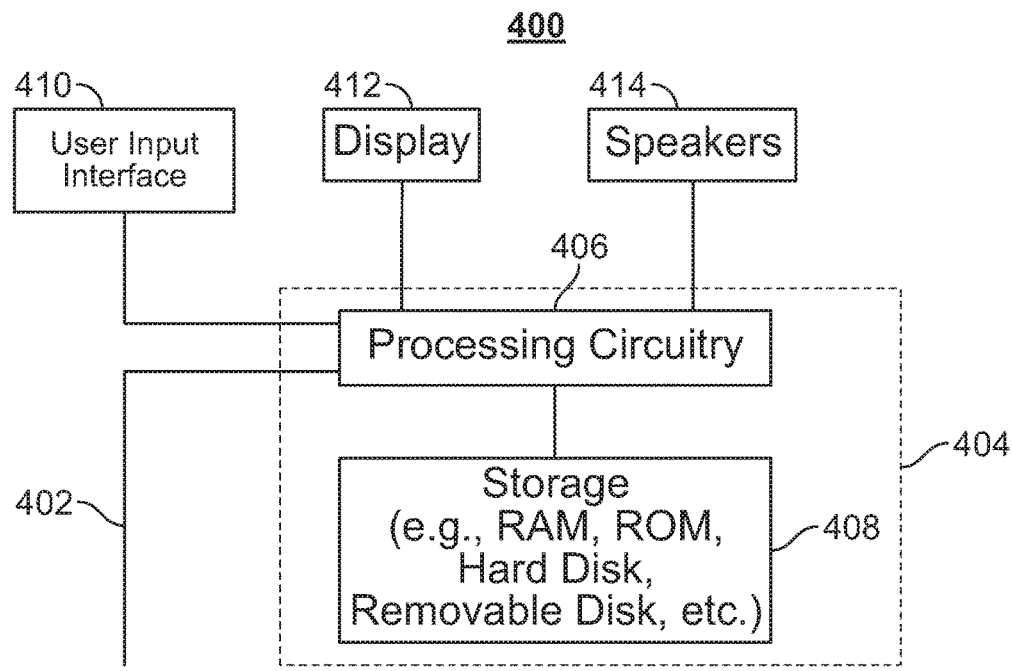
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
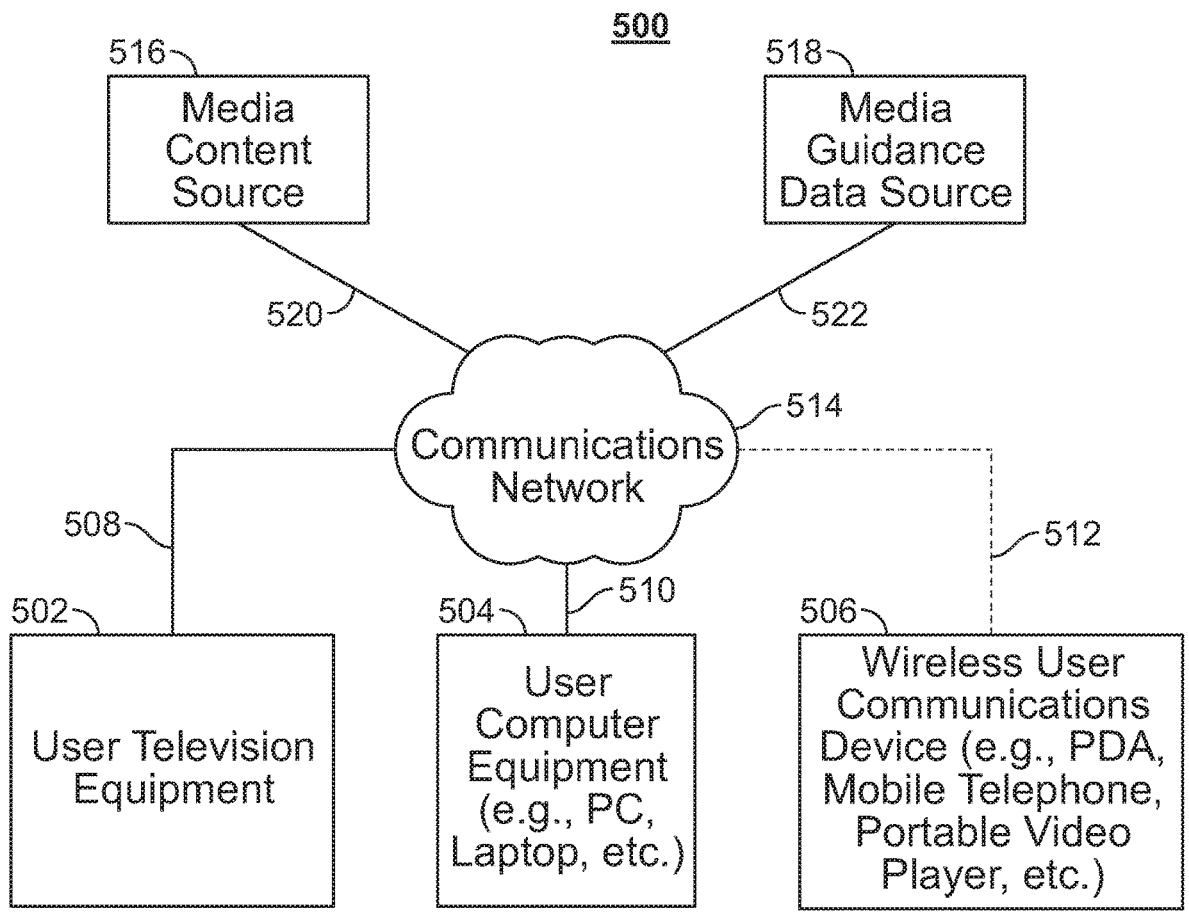
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
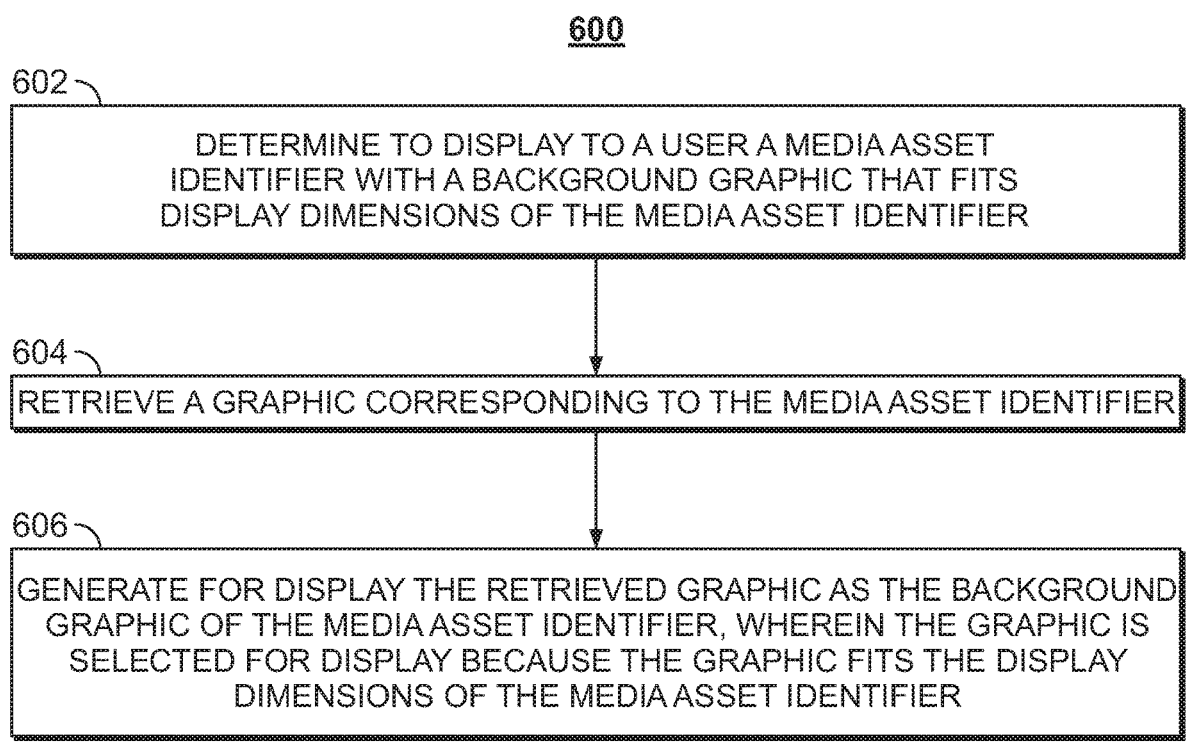
FIG. 6 is a flowchart of illustrative steps for displaying graphics as backgrounds of media asset identifiers, in accordance with some embodiments of the disclosure.

FIG. 6 is a flowchart of illustrative steps for displaying graphics as backgrounds of media asset identifiers, in accordance with some embodiments of the disclosure. For example, a media guidance application implementing process 600 may be executed by control circuitry 404 (FIG. 4)

to display graphics behind media asset identifiers when they are presented to a user on a display screen (e.g., on display 412).

Process 600 begins at 602, where the media guidance application (e.g., executed by control circuitry 404) determines to display to a user a media asset identifier with a background graphic that fits display dimensions of the media asset identifier. For example, the media guidance application (e.g., executed by control circuitry 404) may determine to display (e.g., on display 412) a background graphic for a media asset identifier based on popularity. The media guidance application (e.g., executed by control circuitry 404) may determine whether a media asset is popular based on retrieving information from a third-party data source with ratings or number of viewers.

In some embodiments, the media guidance application (e.g., executed by control circuitry 404) receives a plurality of media asset identifiers. For example, the media guidance application (e.g., executed by control circuitry 404) may receive the media asset identifiers which may be either stored locally in memory (e.g., storage 408 (FIG. 4)) or remotely at a media guidance data source (e.g., media guidance data source 518 (FIG. 5)) accessible via a communications network (e.g., communications network 514 (FIG. 5)). The media asset identifiers may be received by the media guidance application (e.g., executed by control circuitry 404) via a request from the media guidance application (e.g., executed by control circuitry 404) or as periodic automatic updates (e.g., the media guidance application (e.g., executed by control circuitry 404) receives media asset identifiers for media assets starting between 4-6 pm at 3:30 pm and media asset identifiers for media assets starting between 6-8 pm at 5:30 and so on).

The media guidance application (e.g., executed by control circuitry 404) may then compare metadata of each of the plurality of media asset identifiers with metadata of another media asset identifier on a list defined by the user. For example, the media guidance application (e.g., executed by control circuitry 404) may retrieve from a stored watch list (e.g., watch list 150) for the user metadata for a particular media asset identifier on the watch list. Watch list 150 may be stored locally (e.g., at memory 408) or remotely (e.g., at media guidance data source 518, accessible through communications network 514). The metadata may be any string of alphanumeric characters, such as the title of the media asset (e.g., "The Revenant"). The media guidance application (e.g., executed by control circuitry 404) may then compare the retrieved metadata from the media asset identifier on the watch list with metadata associated with the media asset identifier. The media guidance application (e.g., executed by control circuitry 404) may perform the comparison by comparing each successive character in a string of characters and determining whether there are any differences. The media guidance application (e.g., executed by control circuitry 404) then determines, based on the comparison, that the media asset identifier corresponds to the another media asset identifier on the list defined by the user. For example, in response to determining that each character of the retrieved metadata from the media asset identifier on the list matches corresponding characters of metadata from the media asset identifier, the media guidance application (e.g., executed by control circuitry 404) may determine that the two correspond.

Process 600 continues to 604, where the media guidance application (e.g., executed by control circuitry 404) retrieves a graphic corresponding to the media asset identifier. For example, the media guidance application (e.g., executed by control circuitry 404) may access a database containing a plurality of graphics each associated with a media asset identifier stored either stored locally in memory (e.g., storage 408 (FIG. 4)) or remotely at a media guidance data source (e.g., media guidance data source 518 (FIG. 5)) accessible via a communications network (e.g., communications network 514 (FIG. 5)). The database may be organized as a table where each row corresponds to a specific graphic and columns contain metadata identifying media asset identifiers that relate to the graphic. One column of the table may contain a pointer to a location in memory storing a data file for the graphic that can be retrieved by the media guidance application (e.g., executed by control circuitry 404).

In some embodiments, the media guidance application (e.g., executed by control circuitry 404) determines the display dimensions of the media asset identifier. For example, if the media asset identifier is displayed as a cell in a grid-guide, the media guidance application (e.g., executed by control circuitry 404) may determine from metadata associated with the media asset identifier values for height and width for the media asset identifier when it is displayed (e.g., the aspect ratio of cells in the grid-guide). The media guidance application (e.g., executed by control circuitry 404) may then retrieve the graphic that has dimensions that match the display dimensions. For example, the media guidance application (e.g., executed by control circuitry 404) may retrieve a value for the height and width of a graphic determined to correspond to the media asset identifier, as described above. The height and width of the graphic may be stored in column(s) of the table, or may be determined from the data file of the graphic (e.g., either in a header of the file or by examining the pixel coordinates of a bitmap graphics file).

As another example, the media guidance application (e.g., executed by control circuitry 404) may retrieve a single value for the aspect ratio of the cell the media asset identifier will be displayed in (e.g., 2:1 width to height for a 30 minute program and 4:1 for an hour long program) when generated for display as part of a grid-guide. The media guidance application (e.g., executed by control circuitry 404) may then scale a graphic with the same aspect ratio to fit the media asset identifier displayed in a cell of a grid-guide different size display screens.

The media guidance application (e.g., executed by control circuitry 404) then may select the graphic from a plurality of graphics associated with the media asset identifier based on the graphic matching the display dimensions. For example, the media guidance application (e.g., executed by control circuitry 404) may access a database containing a plurality of graphics associated with the media asset identifier. The media guidance application (e.g., executed by control circuitry 404) then may retrieve the dimensions of each graphic stored at the database associated with the media asset identifier. Based on comparing the dimensions of the graphic to the dimensions of the media asset identifier, the media guidance application (e.g., executed by control circuitry 404) may determine whether the dimensions match and retrieve the graphic. For example, the media guidance application (e.g., executed by control circuitry 404) may determine that a graphic associated with "The Revenant" has an aspect ratio of 6:1 and the cell in a grid-guide that the listing for "The Revenant" will be generated in also has an aspect ratio of 6:1 and, because the dimensions match, the media guidance application (e.g., executed by control circuitry 404) will retrieve the graphic. In some embodiments, if the dimensions match within a tolerance factor (e.g., an aspect ratio of 1.9:1 is within a tolerance factor of 2:1 if the factor is +/−20%), then the media guidance application (e.g., executed by control circuitry 404) retrieves the graphic.

In some embodiments, the media guidance application (e.g., executed by control circuitry 404) determines that dimensions of the graphic do not match the display dimensions. For example, the media guidance application (e.g., executed by control circuitry 404) may be unable to retrieve a graphic that has the same dimensions as the media asset identifier when displayed as a cell in a grid-guide due to a limited number of graphics available to be retrieved. As described above, the media guidance application (e.g., executed by control circuitry 404) may determine values for height and width for the media asset identifier when it is displayed (e.g., in a cell of a grid-guide). The media guidance application (e.g., executed by control circuitry 404) may also determine values for the height and width of the retrieved graphic, as described above. Based on comparing the values of the respective heights and widths of the media asset identifier and the graphic, the media guidance application (e.g., executed by control circuitry 404) may determine they do not match. Alternatively, the media guidance application may compare the aspect ratios (e.g., width to height ratios) of the graphic and the displayed media asset identifier. For example, if the graphic has an aspect ratio of 2:1.5 and the media asset identifier when generated for display as a cell in a grid-guide has an aspect ratio of 4:1, the media guidance application (e.g., executed by control circuitry 404) may determine that since the aspect ratios do not match the display dimensions do not match. In some embodiments, the media guidance application (e.g., executed by control circuitry 404) may determine the dimensions do not match if all dimensions do not match. In other embodiments, the media guidance application (e.g., executed by control circuitry 404) may determine the dimensions to not match if only a single dimension does not match.

The media guidance application (e.g., executed by control circuitry 404) then may adjust the graphic to match the display dimensions. For example, the media guidance application (e.g., executed by control circuitry 404) may perform any combination of cropping, scaling, and/or other forms of modifying the graphic so that the dimensions match the display dimensions. As a specific example, the media guidance application (e.g., executed by control circuitry 404) may crop a graphic with dimensions 300×400 such that it can fit in a 200×300 cell of a grid-guide where a media asset identifier is displayed by removing regions from both the height and the width of the graphic. In some embodiments, the regions to crop are chosen based on determining from data in the file that specific regions have very little change in color and are likely background. For example, the graphic may be stored as a bitmap file where each pixel coordinate has an associated color. Based on determining that a particular region uses the same, or substantially the same, color, the media guidance application (e.g., executed by control circuitry 404) may choose that region to crop (e.g., a region that is entirely blue may be a large portion of sky which the media guidance application (e.g., executed by control circuitry 404) can crop without impacting other more important content in the graphic). In other embodiments, the media guidance application (e.g., executed by control circuitry 404) may determine the region to crop based on an indication in the user's profile that they like particular actors. In this situation, the media guidance application (e.g., executed by control circuitry 404) would not crop the actor that the user likes out of the graphic (e.g., if the user likes Matt Damon, the media guidance application would not crop an image of Matt Damon out of the graphic). In yet another embodiment, the media guidance application (e.g., executed by control circuitry 404) may determine the region to crop based on the region containing text. For example, if the graphic includes the title "Friends" but the media asset identifier also includes the title "Friends," the media guidance application may choose to crop that portion of the graphic since displaying the title twice is redundant.

Process 600 continues to 606, where the media guidance application (e.g., executed by control circuitry 404) generates for display the retrieved graphic as the background graphic of the media asset identifier, wherein the graphic is selected for display because the graphic fits the display dimensions of the media asset identifier. For example, after retrieving the graphic associated with the media asset identifier the media guidance application (e.g., executed by control circuitry 404) may generate the graphic (e.g., on display 412) as a background of the media asset identifier (e.g., as a background of a cell defining the media asset identifier in a grid-guide). In some embodiments, the media guidance application (e.g., executed by control circuitry 404) adjusts the transparency of the graphic (e.g., to be more transparent) when generating the graphic as a background. In other embodiments, the media guidance application (e.g., executed by control circuitry 404) adjusts the font, color, or other properties of the displayed media asset identifier to be more visible with the background graphic. In yet another embodiment, the media guidance application (e.g., executed by control circuitry 404) generates a composite image of the media asset identifier and retrieved graphic which is then generated for display.

Figure 7:
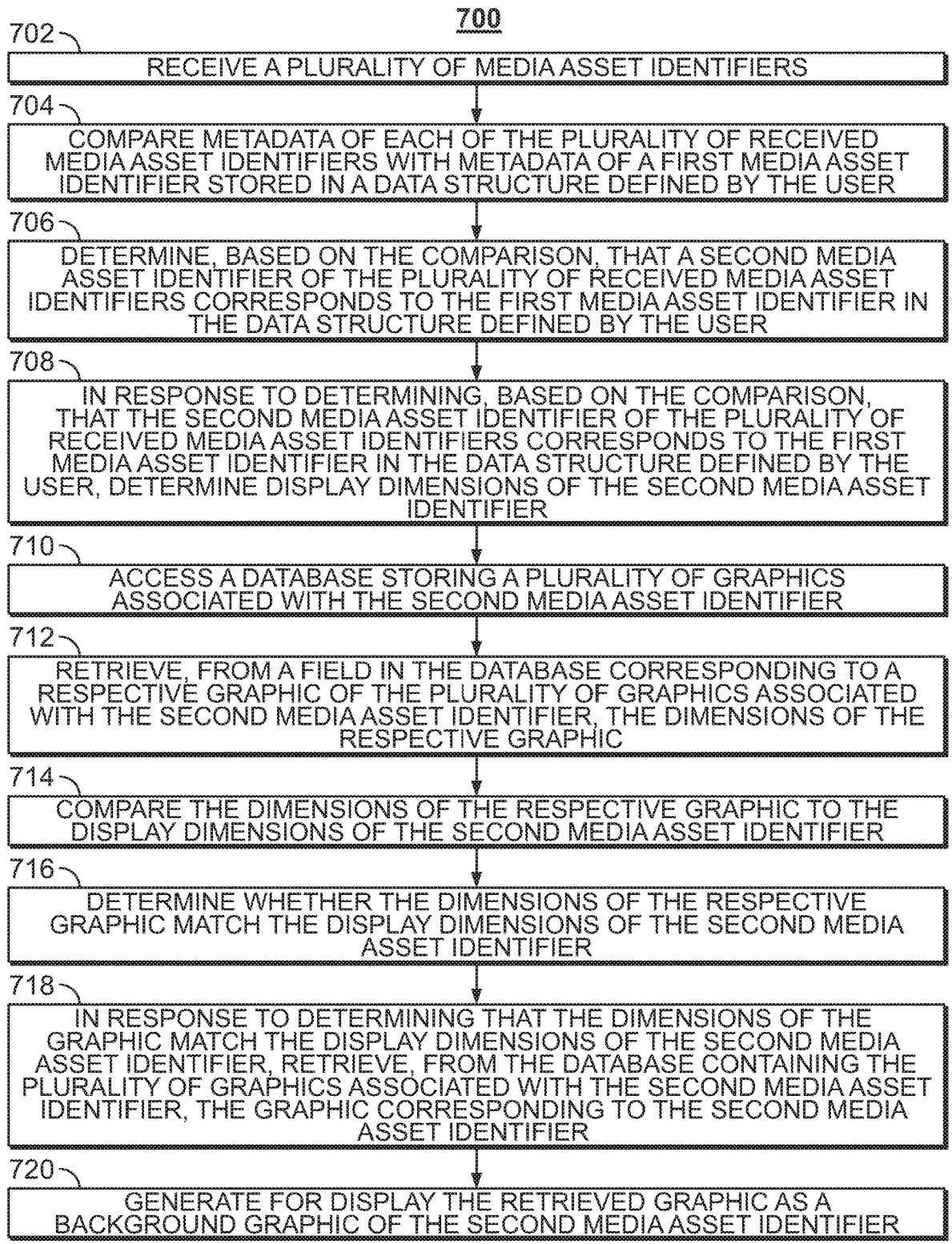
FIG. 7 is a flowchart of illustrative steps for selecting a graphic to be a background of a media asset identifier, in accordance with some embodiments of the disclosure.

FIG. 7 is a flowchart of illustrative steps for selecting a graphic to be a background of a media asset identifier, in accordance with some embodiments of the disclosure. Similar to process 600, process 700 may be executed by control circuitry 404 under instructions from a media guidance application. All interactions between control circuitry 404 and other components of FIGS. 1-5 described above with respect to FIG. 6 also apply equally to FIG. 7.

Process 700 begins at 702, where control circuitry 404 receives a plurality of media asset identifiers (e.g., the media asset identifiers of display 100, as retrieved from media guidance data source 518). At 704, control circuitry 404 may compare metadata of each of the plurality of received media asset identifiers with metadata of a first media asset identifier stored in a data structure defined by the user. As described above, the metadata and/or the data structure may be stored locally at memory 408 or remotely at media guidance data source 518, accessible by way of communications network 514. At 706, the media guidance application may determine, based on the comparison, that a second media asset identifier of the plurality of received media asset identifiers corresponds to the first media asset identifier in the data structure defined by the user (e.g., that media asset identifier 102 corresponds to the media asset "The Bourne Identity," which is also on watch list 150. At 708, in response to determining, based on the comparison, that the second media asset identifier of the plurality of received media asset identifiers corresponds to the first media asset identifier in the data structure defined by the user, control circuitry 404 may determine display dimensions of the second media asset identifier (e.g., in the manners described above with respect to FIGS. 1 and 6). Process 700 proceeds to 710, where control circuitry 404 accesses a database storing a plurality of graphics associated with the second media asset identifier, and retrieves, from a field in the database corresponding to a respective graphic of the plurality of graphics associated with the second media asset identifier, the dimensions of the respective graphic. For example, the database may be media guidance data source 518.

At 714, control circuitry 404 compares the dimensions of the respective graphic to the display dimensions of the second media asset identifier, and at 716, control circuitry 404 determines whether the dimensions of the respective graphic match the display dimensions of the second media asset identifier. At 718, in response to determining that the dimensions of the graphic match the display dimensions of the second media asset identifier, control circuitry 404 retrieves, from the database containing the plurality of graphics associated with the second media asset identifier (e.g., media guidance data source 518), the graphic corresponding to the second media asset identifier. At 720, control circuitry 404 generates for display the retrieved graphic as a background graphic of the second media asset identifier.

Figure 8:
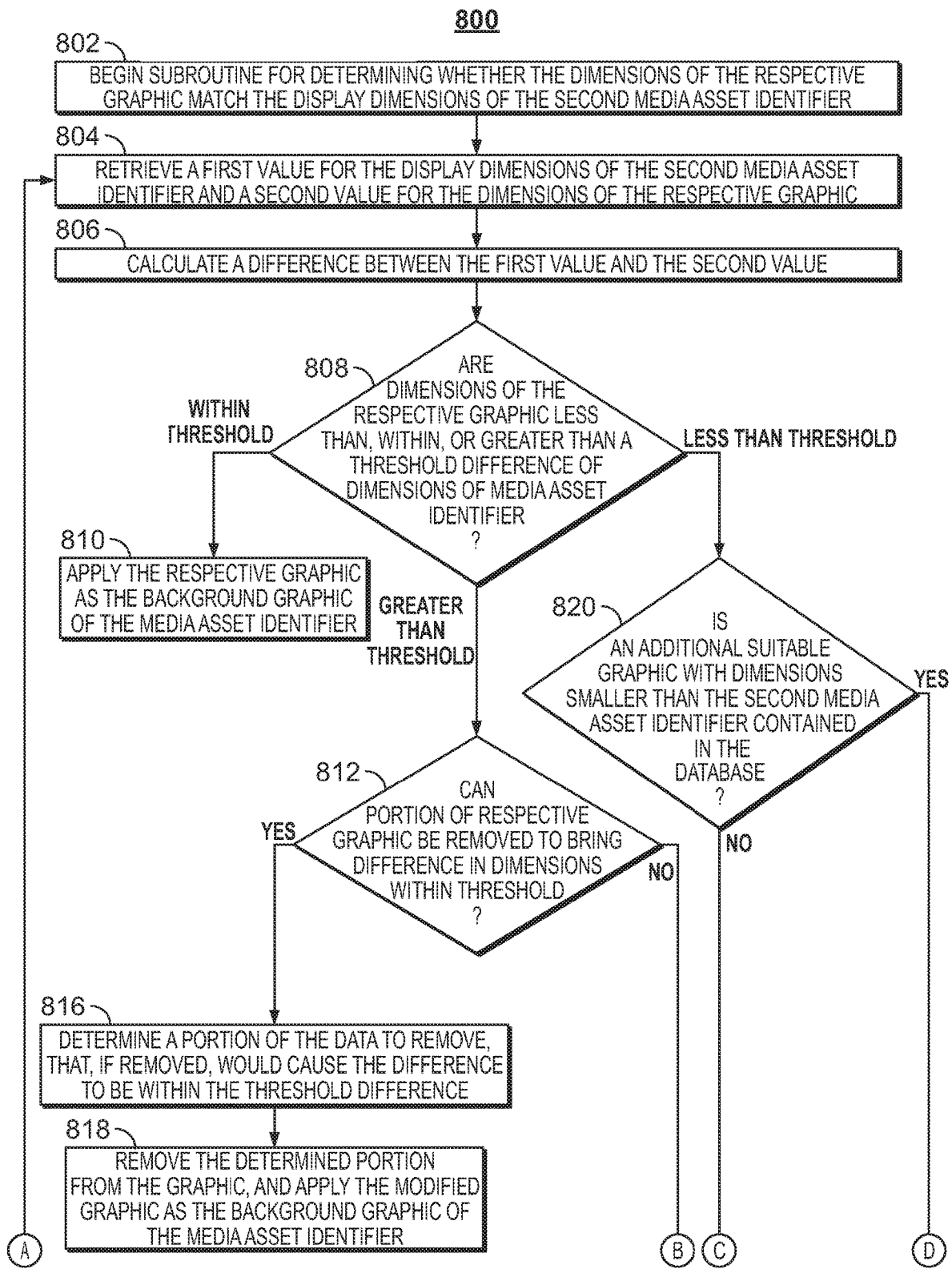
FIG. 8 is a flowchart of illustrative steps for selecting and potentially manipulating a graphic to be a background of a media asset identifier, in accordance with some embodiments of the disclosure.
Figure 8:
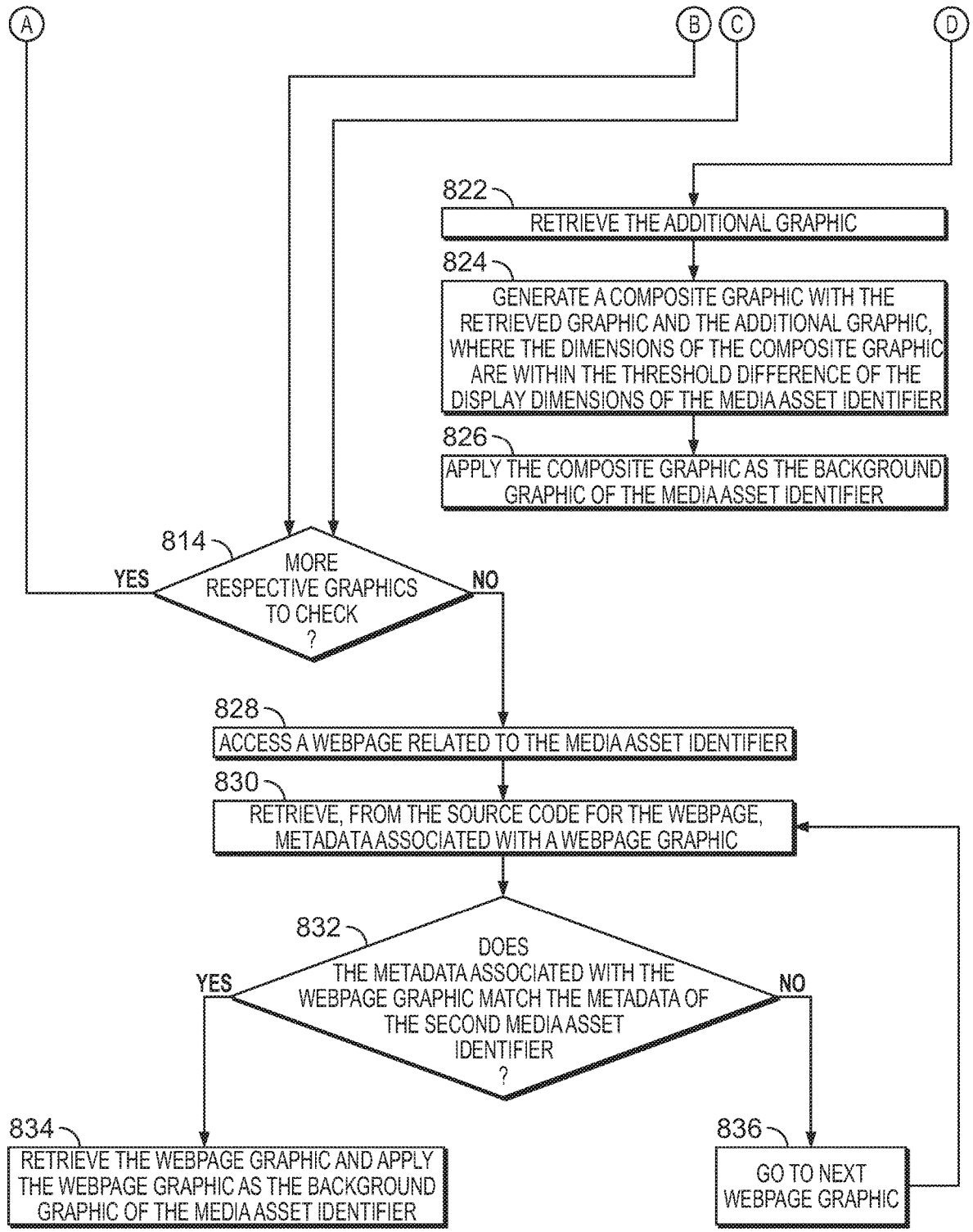

FIG. 8 is a flowchart of illustrative steps for selecting and potentially manipulating a graphic to be a background of a media asset identifier, in accordance with some embodiments of the disclosure. Similar to processes 600 and 700, process 800 may be executed by control circuitry 404 under instructions from a media guidance application. All interactions between control circuitry 404 and other components of FIGS. 1-5 described above with respect to FIGS. 6 and 7 also apply equally to FIG. 8.

Process 800 begins at 802, where control circuitry 404 may begin a subroutine for determining whether the dimensions of the respective graphic match the display dimensions of the second media asset identifier (e.g., a subroutine for executing 716 (e.g., in combination with 718 and/or 720). At 804, control circuitry 404 retrieves a first value for the display dimensions of the second media asset identifier, and retrieves a second value for the dimensions of the respective graphic. For example, control circuitry 404 retrieves a first value for display dimensions of media asset identifier 102, and a second value for a candidate graphic for background graphic 104.

At 806, control circuitry 404 calculates a difference between the first value and the second value, and at 808, control circuitry 404 determines whether the dimensions of the respective graphic are less than, within, or greater than a threshold difference of dimensions of media asset identifier. If the dimensions of the respective graphic are within the threshold difference, process 800 continues to 810, where control circuitry 404 applies the respective graphic as the background graphic of the media asset identifier (e.g., as background graphic 104 of media asset identifier 102).

If the dimensions of the respective graphic are greater than the threshold difference, process 800 continues to 812, where control circuitry 404 determines whether a portion of respective graphic may be removed to bring the difference in dimensions within the threshold. Manners in which control circuitry 404 may determine whether a portion of a respective graphic may be removed to bring a difference in dimensions within the threshold are described above and apply equally to 812 (e.g., by analyzing a pixel map). If the portion may be removed, process 800 continues to 816, where control circuitry 404 determines a portion of the data to remove, that, if removed, would cause the difference to be within the threshold difference, and then to 818, where control circuitry 404 removes remove the determined portion from the graphic, and applies the modified graphic as the background graphic of the media asset identifier. Determining which portion to remove and actually removing that portion is described above in greater detail with respect to FIG. 1, and those details apply equally to 816 and 818.

If control circuitry 404 is unable to remove a portion of the graphic to fit within the threshold, process 800 proceeds to 814, where control circuitry 404 determines whether there are more respective graphics (e.g., in a library of candidate graphics) to vet as a possible background graphic 104, and then returns to 804 if there are more candidates to vet.

Returning to 808, if the dimensions of the respective graphic are less than the threshold difference, process 800 continues to 820, where control circuitry 404 determines whether there is an additional suitable graphic with dimensions smaller than the second media asset identifier contained in the database. If there is such a suitable graphic, control circuitry retrieves the additional graphic at 822, and generates a composite graphic with the retrieved graphic and the additional graphic at 824, where the dimensions of the composite graphic are within the threshold difference of the display dimensions of the media asset identifier. The determination and generation of a composite graphic are described in further detail above with respect to FIG. 1, and apply equally to 824. At 826, control circuitry 404 applies the composite graphic as the background graphic of the media asset identifier (e.g., background graphic 104 of media asset identifier 102).

If there is no such suitable smaller graphic at 820, process 800 proceeds to 814, where control circuitry 404 determines whether there are more respective graphics (e.g., in a library of candidate graphics) to vet as a possible background graphic 104, and then returns to 804 if there are more candidates to vet. If, at 814, there are no further possible background graphics to vet, process 800 continues to 828, where control circuitry 404 accesses a webpage related to the media asset identifier. At 830, control circuitry retrieves, from the source code for the webpage, metadata associated with a webpage graphic.

At 832, control circuitry 404 determines whether the metadata associated with the webpage graphic matches the metadata of the second media asset identifier. If there is no match, process 800 reverts to 828 by way of 836, where a next webpage graphic is checked for a match. If there is a match, process 800 continues to 834, where control circuitry 404 retrieves the webpage graphic and apply the webpage graphic as the background graphic of the media asset identifier It is contemplated that the steps or descriptions of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5 could be used to perform one or more of the steps in FIGS. 6-8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for selecting graphics to display as backgrounds of media asset identifiers, the method comprising:
receiving a plurality of media asset identifiers;
comparing metadata of each of the plurality of received media asset identifiers with metadata of a first media asset identifier stored in a data structure;
determining, based on the comparing, that a second media asset identifier of the plurality of received media asset identifiers corresponds to the first media asset identifier stored in the data structure;
in response to the determining, determining display dimensions of the second media asset identifier;
accessing a database storing a plurality of graphics associated with the second media asset identifier;
retrieving, from a field in the database corresponding to a respective graphic of the plurality of graphics associated with the second media asset identifier, the dimensions of the respective graphic;
comparing the dimensions of the respective graphic to the display dimensions of the second media asset identifier;
determining whether the dimensions of the respective graphic match the display dimensions of the second media asset identifier;
in response to determining that the dimensions of the respective graphic match the display dimensions of the second media asset identifier, retrieving, from the database storing the plurality of graphics associated with the second media asset identifier, the graphic corresponding to the second media asset identifier;
generating for display the retrieved graphic as a background graphic of the second media asset identifier;
determining that the dimensions of each respective graphic of the plurality of graphics associated with the second media asset identifier stored in the database do not match the display dimensions of the second media asset identifier;
in response to determining that the dimensions of each respective graphic of the plurality of graphics associated with the second media asset identifier stored in the database do not match the display dimensions of the second media asset identifier, accessing a server;
retrieving metadata associated with a server graphic;
comparing the metadata associated with the server graphic with the metadata of the second media asset identifier;
in response to determining the metadata associated with the server graphic matches the metadata of the second media asset identifier, retrieving the server graphic; and
generating for display the retrieved server graphic as the background graphic.

2. The method of claim 1, wherein determining whether the dimensions of the respective graphic match the display dimensions of the second media asset identifier comprises:
retrieving a first value for the display dimensions of the second media asset identifier;
retrieving a second value for the dimensions of the respective graphic;
calculating a difference between the first value and the second value; and
determining whether the dimensions of the graphic match the display dimensions of the second media asset identifier based on the calculated difference being within a threshold difference.

3. The method of claim 2, wherein the second value is greater than the first value and wherein the calculated difference exceeds the threshold difference, the method further comprising:
opening a file containing data for the retrieved graphic;
determining a portion of the data to remove, that, if removed, would cause the difference to be within the threshold difference; and
generating for display the retrieved graphic as the background graphic without the determined portion of the data from the file.

4. The method of claim 3, wherein the data is a pixel map containing pixel coordinates with associated properties for each pixel, and wherein determining the portion of the data to remove, that, if removed, would cause the difference to be within the threshold difference comprises:
retrieving color information for a first pixel from the pixel map;
determining that a subset of pixels of the pixel map with pixel coordinates near the first pixel have the same color information; and
marking the subset of pixels as the portion to not be generated for display when generating for display the background graphic.

5. The method of claim 3, wherein determining the portion of the data to remove, that, if removed, would cause the difference to be within the threshold difference comprises:
retrieving, from a user profile corresponding to the user, an indication that the user prefers a first type of image;
determining whether a plurality of types of images are contained in the file including the first type of image; and
in response to determining that the plurality of types of images are contained in the file including the first type of image, marking a subset of the data defining each of the plurality of types that are not the first type of image as the portion to not be generated for display when generating for display the background graphic.

6. The method of claim 2, wherein the first value is greater than the second value and wherein the calculated difference exceeds the threshold difference, further comprising:
determining whether an additional graphic with dimensions smaller than the second media asset identifier is contained in the database;
in response to determining that the additional graphic with display dimensions smaller than the second media asset identifier is contained in the database, retrieving the additional graphic; and
generating for display a composite graphic with the retrieved graphic and the additional graphic, wherein the composite graphic matches the display dimensions of the second media asset identifier.

7. The method of claim 1, wherein accessing the server comprises accessing a webpage, and wherein the server graphic is a webpage graphic.

8. The method of claim 1, wherein generating for display the retrieved graphic as the background graphic of the second media asset identifier comprises:
determining a section of the graphic that text relating to the second media asset identifier will be displayed over;
determining an average color of the section of the graphic;
accessing a complementary colors database;
retrieving from the complementary colors database, a complementary color to the average color; and generating for display the text relating to the second media asset identifier in the complementary color.

9. A method for selecting graphics to display as backgrounds of media asset identifiers, the method comprising:

receiving a plurality of media asset identifiers;

comparing metadata of each of the plurality of received media asset identifiers with metadata of a first media asset identifier stored in a data structure;

determining, based on the comparing, that a second media asset identifier of the plurality of received media asset identifiers corresponds to the first media asset identifier stored in the data structure;

in response to the determining, accessing a display template containing display dimensions for a plurality of template media asset identifiers;

comparing the metadata associated with the second media asset identifier with metadata associated with each of the plurality of template media asset identifiers;

determining that the second media asset identifier corresponds to a template media asset identifier of the plurality of template media asset identifiers;

determining the display dimensions for the template media asset identifier to be display dimensions for the second media asset identifier;

accessing a database storing a plurality of graphics associated with the second media asset identifier;

retrieving, from a field in the database corresponding to a respective graphic of the plurality of graphics associated with the second media asset identifier, the dimensions of the respective graphic;

comparing the dimensions of the respective graphic to the display dimensions of the second media asset identifier;

determining whether the dimensions of the respective graphic match the display dimensions of the second media asset identifier;

in response to determining that the dimensions of the graphic match the display dimensions of the second media asset identifier, retrieving, from the database storing the plurality of graphics associated with the second media asset identifier, the graphic corresponding to the second media asset identifier; and generating for display the retrieved graphic as a background graphic of the second media asset identifier.

10. The method of claim 9, wherein the retrieved graphic is a first graphic, and the method further comprises:

retrieving a second graphic, from the database, with dimensions that match the display dimensions of the second media asset identifier;

determining that a user has navigated to the second media asset identifier; and in response to determining that the user has navigated to the second media asset identifier, generating for display the second graphic as the background graphic of the second media asset identifier instead of the first graphic.

11. A system for selecting graphics to display as backgrounds of media asset identifiers, the system comprising:

communications circuitry;

display circuitry;

and control circuitry configured to:

receive, using the communications circuitry, a plurality of media asset identifiers;

compare metadata of each of the plurality of received media asset identifiers with metadata of a first media asset identifier stored in a data structure;

determine, based on the comparing, that a second media asset identifier of the plurality of received media asset identifiers corresponds to the first media asset identifier stored in the data structure;

in response to the determining, determine display dimensions of the second media asset identifier;

access, using the communications circuitry, a database storing a plurality of graphics associated with the second media asset identifier;

retrieve, using the communications circuitry, from a field in the database corresponding to a respective graphic of the plurality of graphics associated with the second media asset identifier, the dimensions of the respective graphic;

compare the dimensions of the respective graphic to the display dimensions of the second media asset identifier;

determine whether the dimensions of the respective graphic match the display dimensions of the second media asset identifier;

in response to determining that the dimensions of the respective graphic match the display dimensions of the second media asset identifier, retrieve, using the communications circuitry, from the database storing the plurality of graphics associated with the second media asset identifier, the graphic corresponding to the second media asset identifier;

generate for display, using the display circuitry, the retrieved graphic as a background graphic of the second media asset identifier;

determine that the dimensions of each respective graphic of the plurality of graphics associated with the second media asset identifier stored in the database do not match the display dimensions of the second media asset identifier;

in response to determining that the dimensions of each respective graphic of the plurality of graphics associated with the second media asset identifier stored in the database do not match the display dimensions of the second media asset identifier, access a server;

retrieve metadata associated with a server graphic;

compare the metadata associated with the server graphic with the metadata of the second media asset identifier;

in response to determining the metadata associated with the server graphic matches the metadata of the second media asset identifier, retrieve the server graphic; and generate for display the retrieved server graphic as the background graphic.

12. The system of claim 11, wherein the control circuitry is further configured, when determining whether the dimensions of the respective graphic match the display dimensions of the second media asset identifier, to:

retrieve a first value for the display dimensions of the second media asset identifier;

retrieve a second value for the dimensions of the respective graphic;

calculate a difference between the first value and the second value; and determine whether the dimensions of the graphic match the display dimensions of the second media asset identifier based on the calculated difference being within a threshold difference.

13. The system of claim 12, wherein the second value is greater than the first value, wherein the calculated difference exceeds the threshold difference, and wherein the control circuitry is further configured to:

open a file containing data for the retrieved graphic;

determine a portion of the data to remove, that, if removed, would cause the difference to be within the threshold difference; and generate for display the retrieved graphic as the background graphic without the determined portion of the data from the file.

14. The system of claim 13, wherein the data is a pixel map containing pixel coordinates with associated properties for each pixel, and wherein the control circuitry is further configured, when determining the portion of the data to remove, that, if removed, would cause the difference to be within the threshold difference, to:

retrieve color information for a first pixel from the pixel map;

determine that a subset of pixels of the pixel map with pixel coordinates near the first pixel have the same color information; and mark the subset of pixels as the portion to not be generated for display when generating for display the background graphic.

15. The system of claim 13, wherein the control circuitry is further configured, when determining the portion of the data to remove, that, if removed, would cause the difference to be within the threshold difference, to:

retrieve, from a user profile corresponding to the user, an indication that the user prefers a first type of image;

determine whether a plurality of types of images are contained in the file including the first type of image; and in response to determining that the plurality of types of images are contained in the file including the first type of image, mark a subset of the data defining each of the plurality of types that are not the first type of image as the portion to not be generated for display when generating for display the background graphic.

16. The system of claim 12, wherein the first value is greater than the second value, wherein the calculated difference exceeds the threshold difference, and wherein the control circuitry is further configured to:

determine whether an additional graphic with dimensions smaller than the second media asset identifier is contained in the database;

in response to determining that the additional graphic with display dimensions smaller than the second media asset identifier is contained in the database, retrieve the additional graphic; and generate for display a composite graphic with the retrieved graphic and the additional graphic, wherein the composite graphic matches the display dimensions of the second media asset identifier.

17. The system of claim 11, wherein accessing the server comprises accessing a webpage, and wherein the server graphic is a webpage graphic.

18. The system of claim 11, wherein the control circuitry is further configured, when generating for display the retrieved graphic as the background graphic of the second media asset identifier, to:

determine a section of the graphic that text relating to the second media asset identifier will be displayed over;

determine an average color of the section of the graphic;

access a complementary colors database;

retrieve from the complementary colors database, a complementary color to the average color; and generate for display the text relating to the second media asset identifier in the complementary color.

19. A system for selecting graphics to display as backgrounds of media asset identifiers, the system comprising:

communications circuitry;

display circuitry;

and control circuitry configured to:

receive, using the communications circuitry, a plurality of media asset identifiers;

compare metadata of each of the plurality of received media asset identifiers with metadata of a first media asset identifier stored in a data structure;

determine, based on the comparing, that a second media asset identifier of the plurality of received media asset identifiers corresponds to the first media asset identifier stored in the data structure;

in response to the determining, access a display template containing display dimensions for a plurality of template media asset identifiers;

compare the metadata associated with the second media asset identifier with metadata associated with each of the plurality of template media asset identifiers;

determine that the second media asset identifier corresponds to a template media asset identifier of the plurality of template media asset identifiers;

determine the display dimensions for the template media asset identifier to be display dimensions for the second media asset identifier;

access, using the communications circuitry, a database storing a plurality of graphics associated with the second media asset identifier;

retrieve, using the communications circuitry, from a field in the database corresponding to a respective graphic of the plurality of graphics associated with the second media asset identifier, the dimensions of the respective graphic;

compare the dimensions of the respective graphic to the display dimensions of the second media asset identifier;

determine whether the dimensions of the respective graphic match the display dimensions of the second media asset identifier;

in response to determining that the dimensions of the graphic match the display dimensions of the second media asset identifier, retrieve, using the communications circuitry, from the database storing the plurality of graphics associated with the second media asset identifier, the graphic corresponding to the second media asset identifier; and generate for display, using the display circuitry, the retrieved graphic as a background graphic of the second media asset identifier.

20. The system of claim 19, wherein the retrieved graphic is a first graphic, and wherein the control circuitry is further configured to:

retrieve a second graphic from the database with dimensions that match the display dimensions of the second media asset identifier;

determine that a user has navigated to the second media asset identifier; and in response to determining that the user has navigated to the second media asset identifier, generate for display the second graphic as the background graphic of the second media asset identifier instead of the first graphic.

* * * * *